(12) United States Patent
Watson et al.

(10) Patent No.: US 7,113,874 B2
(45) Date of Patent: Sep. 26, 2006

(54) MAGNETIC CRASH SENSING METHOD

(75) Inventors: William Todd Watson, Belleville, MI (US); Leonard S. Cech, Brighton, MI (US); Debra A. Rice, Northville, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 10/946,151

(22) Filed: Sep. 20, 2004

(65) Prior Publication Data
US 2005/0096881 A1    May 5, 2005

Related U.S. Application Data

(60) Provisional application No. 60/503,906, filed on Sep. 19, 2003.

(51) Int. Cl.
*G08B 19/00* (2006.01)
(52) U.S. Cl. .................. 702/65; 702/190; 340/522; 324/270.13
(58) Field of Classification Search .................. None
See application file for complete search history.

(56) References Cited

U.S. PATENT DOCUMENTS

| | | | | |
|---|---|---|---|---|
| 1,813,746 A | | 7/1931 | Kinsley ..................... 324/243 |
| 2,552,722 A | | 5/1951 | King ............................. 264/1 |
| 3,659,197 A | | 4/1972 | Alley ........................... 324/51 |
| 3,945,459 A | | 3/1976 | Oishi et al. ................. 180/274 |
| 4,087,782 A | | 5/1978 | Oishi et al. ................. 180/271 |
| 4,178,979 A | | 12/1979 | Birat ............................ 164/49 |
| 4,206,451 A | * | 6/1980 | Kurschner .................. 340/522 |
| 4,446,741 A | | 5/1984 | Sirokorad et al. ............. 73/654 |
| 4,531,091 A | | 7/1985 | Kusenberger et al. ...... 324/242 |
| 4,561,314 A | | 12/1985 | Alley et al. ............... 73/862.69 |
| 4,651,093 A | | 3/1987 | Detriche' et al. ............ 324/232 |
| 4,802,368 A | | 2/1989 | Nordvall .................. 73/862.69 |
| 4,823,621 A | | 4/1989 | Sobel ....................... 73/862.69 |
| 4,855,677 A | | 8/1989 | Clark, Jr. et al. ........... 324/238 |
| 4,866,418 A | | 9/1989 | Dobler et al. ............... 340/429 |
| 4,893,077 A | | 1/1990 | Auchterlonie ............... 324/208 |
| 5,007,295 A | | 4/1991 | Gustafsson et al. ....... 73/862.69 |

(Continued)

FOREIGN PATENT DOCUMENTS

EP    0 453 824 A1    10/1991

(Continued)

OTHER PUBLICATIONS

Kwun, H., "Magnetostrictive Sensors Technology", reprinted from Technology Today, Mar. 1995, pp. 3-7.

(Continued)

*Primary Examiner*—Carol S. W. Tsai
(74) *Attorney, Agent, or Firm*—Raggio & Dinnin, P.C.

(57) ABSTRACT

A signal generated responsive to a magnetic field in a magnetic circuit is decomposed into first and second filtered signals, wherein, at at least one first frequency, a magnitude of a component of the first filtered signal is greater than that of the second filtered signal, and at at least one second frequency greater than the at least one first frequency, a magnitude of a component of the second filtered signal is greater than that of the first filtered signal. A condition of a magnetic circuit is sensed responsive to the first and second filtered signals. In one embodiment, actuation of a safety restraint actuator of a vehicle is controlled responsive to the sensed condition of the magnetic circuit that includes a portion of the vehicle susceptible to a crash. A deployment threshold is adjusted responsive to a door opening state.

29 Claims, 4 Drawing Sheets

U.S. PATENT DOCUMENTS

| | | | | |
|---|---|---|---|---|
| 5,041,769 A | | 8/1991 | Iwai | 318/254 |
| 5,068,608 A | | 11/1991 | Clark, Jr. | 324/220 |
| 5,134,371 A | | 7/1992 | Watanabe | 324/252 |
| 5,144,846 A | | 9/1992 | Klauber et al. | 73/862.336 |
| 5,177,370 A | | 1/1993 | Meister | 307/10.1 |
| 5,182,513 A | | 1/1993 | Young et al. | 324/232 |
| 5,359,286 A | | 10/1994 | Kaiser et al. | 324/207.2 |
| 5,399,968 A | | 3/1995 | Sheppard et al. | 324/242 |
| 5,437,197 A | | 8/1995 | Uras et al. | 73/862.69 |
| 5,559,431 A | | 9/1996 | Sellen | 324/202 |
| 5,580,084 A | | 12/1996 | Gioutsos | 280/735 |
| 5,610,583 A | * | 3/1997 | Drebika et al. | 340/566 |
| 5,636,863 A | | 6/1997 | Reid et al. | 280/735 |
| 5,646,613 A | | 7/1997 | Cho | 340/903 |
| 5,707,076 A | | 1/1998 | Takahashi | 280/735 |
| 5,739,757 A | | 4/1998 | Gioutsos | 340/667 |
| 5,747,696 A | | 5/1998 | Kwun et al. | 73/728 |
| 5,767,766 A | | 6/1998 | Kwun | 340/436 |
| 5,783,871 A | | 7/1998 | LeMense | 307/10.1 |
| 5,793,200 A | | 8/1998 | Berrill | 324/207.2 |
| 5,793,206 A | | 8/1998 | Goldfine et al. | 324/242 |
| 5,892,443 A | * | 4/1999 | Friedrich | 340/540 |
| 5,895,439 A | | 4/1999 | Fisher et al. | 702/36 |
| 5,940,003 A | * | 8/1999 | Schulz | 340/5.66 |
| 5,966,011 A | | 10/1999 | Goldfine et al. | 324/242 |
| RE36,427 E | | 12/1999 | Gioutsos | 280/735 |
| 6,005,392 A | | 12/1999 | Patzwaldt | 324/329 |
| 6,018,980 A | | 2/2000 | Kimura et al. | 73/12.04 |
| 6,039,345 A | | 3/2000 | Cech et al. | 280/735 |
| 6,060,969 A | * | 5/2000 | Hufgard et al. | 335/207 |
| 6,203,060 B1 | | 3/2001 | Cech et al. | 280/735 |
| 6,252,393 B1 | | 6/2001 | Hedengren | 324/202 |
| 6,288,536 B1 | | 9/2001 | Mandl et al. | 324/225 |
| 6,288,537 B1 | | 9/2001 | Viertl et al. | 324/230 |
| 6,317,048 B1 | | 11/2001 | Bomya et al. | 340/573.1 |
| 6,329,910 B1 | | 12/2001 | Farrington | 340/436 |
| 6,351,120 B1 | | 2/2002 | Goldfine | 324/262 |
| 6,407,660 B1 | | 6/2002 | Bomya | 340/436 |
| 6,433,688 B1 | | 8/2002 | Bomya | 340/573.1 |
| 6,469,499 B1 | * | 10/2002 | Delaporte | 324/207.13 |
| 6,552,662 B1 | | 4/2003 | Bomya et al. | 340/572.1 |
| 6,583,616 B1 | * | 6/2003 | Bomya | 324/207.17 |
| 6,586,926 B1 | * | 7/2003 | Bomya | 324/207.17 |
| 6,587,048 B1 | | 7/2003 | Bomya | 340/573.1 |
| 6,631,776 B1 | | 10/2003 | Bomya | 180/169 |
| 6,777,927 B1 | * | 8/2004 | Bomya | 324/207.17 |
| 6,812,697 B1 | | 11/2004 | McKnight et al. | 324/262 |
| 2002/0003421 A1 | | 1/2002 | Kawata et al. | 324/233 |
| 2002/0126004 A1 | | 9/2002 | Gioutsos et al. | 340/438 |
| 2004/0056652 A1 | * | 3/2004 | Bomya | 324/207.17 |
| 2004/0061617 A1 | | 4/2004 | Gioutsos et al. | 340/667 |
| 2004/0075429 A1 | | 4/2004 | Hiroshima | 324/242 |
| 2004/0130315 A1 | * | 7/2004 | Lamb et al. | 324/207.2 |
| 2005/0007108 A1 | | 1/2005 | Dogaru | 324/235 |
| 2005/0093540 A1 | | 5/2005 | Merrick et al. | 324/239 |
| 2005/0096881 A1 | * | 5/2005 | Watson et al. | 702/190 |
| 2005/0143944 A1 | | 6/2005 | Cech et al. | 702/115 |

FOREIGN PATENT DOCUMENTS

| | | |
|---|---|---|
| JP | 56-157802 | 5/1981 |

OTHER PUBLICATIONS

Uras, M., "Signal Detection Methods for Magnetostrictive Sensors", 970604, reprinted from *Sensors and Actuators* 1997, SP-1220, Society of Automotive Engineers, Feb. 24, 1997, pp. 23-33.

Technical paper eddyc.pdf downloaded from the internet at http://joe.buckley.net/papers on Sep. 8, 2003, 7 pp.

Internet web pages at http://www.ndt-ed.org/EducationResources/CommunityCollege/EddyCurrents/cc_ec_index.htm, downloaded on Jun. 17, 2004 and Oct. 13, 2005, 118 pp.

\* cited by examiner

MAGNETIC CRASH SENSING METHOD

CROSS-REFERENCE TO RELATED APPLICATIONS

The instant application claims the benefit of prior U.S. Provisional Application Ser. No. 60/503,906 filed on Sep. 19, 2003, which is incorporated herein by reference.

BRIEF DESCRIPTION OF THE DRAWINGS

In the accompanying drawings:

FIG. 5 illustrates a plot of a signal from a magnetic sensor of a magnetic crash sensor associated with a rear door of a vehicle responsive to a relatively high speed slam of the rear door, for various opening angles of the associated front door.

DESCRIPTION OF EMBODIMENT(S)

Figure 1:
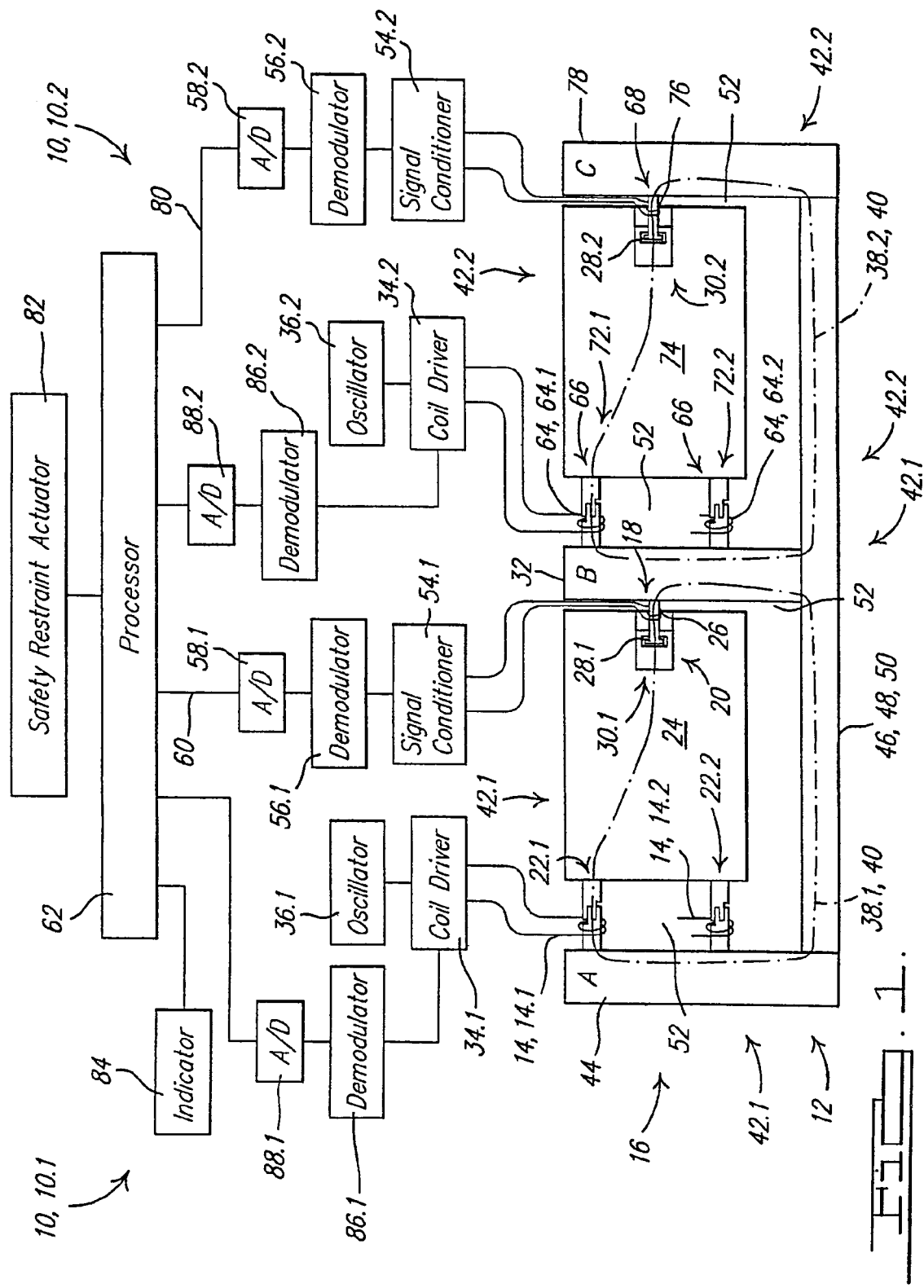
FIG. 1 illustrates a schematic block diagram of a magnetic crash sensor in a vehicle.

Referring to FIG. 1, a first magnetic crash sensor 10.1 incorporated in a vehicle 12 comprises at least one first coil 14 at a corresponding at least one first location 16 of the vehicle 12, and an associated at least one first magnetic sensor 18 at a corresponding at least one second location 20 of the vehicle 12. For example, in the embodiment illustrated in FIG. 1, a first coil 14 is located around an upper hinge 22.1 of a front door 24 of the vehicle 12, and the at least one first magnetic sensor 18 comprises a second coil 26 around the striker 28.1 of the door latch assembly 30.1 of the front door 24, wherein the striker 28.1 is operatively coupled to the B-pillar 32 of the vehicle 12 and the second coil 26 is proximate thereto. The at least one first coil 14 is operatively coupled to a first coil driver 34.1, which is in turn operatively coupled to a first oscillator 36.1, wherein an oscillatory signal from the first oscillator 36.1 is applied by the first coil driver 34.1 to cause an associated current in the at least one first coil 14, responsive to which the at least one first coil 14 generates a first magnetic field 38.1 comprising magnetic flux 40 in an associated first magnetic circuit 42.1 comprising the A-pillar 44, front door 24, B-pillar 32, and the body 46, frame 48 or powertrain 50 of the vehicle 12. The first oscillator 36.1 generates an oscillating signal, for example, having either a sinusoidal, square wave, triangular or other waveform shape, of a single frequency, or a plurality of frequencies that, for example, are either stepped, continuously swept or simultaneous. The frequency is adapted so that the resulting first magnetic field 38.1 is conducted through the first magnetic circuit 42.1 with sufficient strength so as to provide a useful signal level from the first magnetic sensor 18 that cooperates therewith. For example, the oscillation frequency would typically be less than about 100 KHz for a steel structure, e.g. 20 to 30 KHz in one embodiment. An oscillation frequency in the audio range, e.g. 10 to 20 KHz, can also be used for crash sensing, however, such frequencies may cause an audible hum to be generated by the associated magnetic circuit. The first magnetic field 38.1 is responsive to the reluctance $\mathcal{R}$ of the associated first magnetic circuit 42.1, which is affected by a crash involving the elements thereof and/or the gaps 52 therein. The first magnetic field 38.1 is sensed by the at least one first magnetic sensor 18, and the signal therefrom is conditioned by an associated first signal conditioner 54.1, demodulated by a first demodulator 56.1, converted from analog to digital form by a first analog-to-digital converter 58.1, and input as a first magnetic sensor signal 60 to a processor 62, which processes the signal as described more fully hereinbelow. The first signal conditioner 54.1 may incorporate buffering, amplification, high-pass, low-pass, or band-pass filtering, The first demodulator 56.1, for example, may provide amplitude demodulation, constant sampling relative to the phase of the first oscillator 36.1, or constant sampling relative to the phase of the signal sensed by the first magnetic sensor 18. For example, any envelope detection or phase or frequency demodulation technique could be used to obtain the demodulated signal. Since various demodulation techniques could be used to extract the crash information from the signal from the first magnetic sensor 18, the particular demodulation method will, for example, depend upon the particular implementation and the cost of the components used to perform this function. In another embodiment, the analog-to-digital conversion function and the demodulation function are combined a single process. It should be understood that the first demodulator 56.1 may also provide for amplification, and that the first analog-to-digital converter 58.1 would incorporate an associated sampler. Changes to the first magnetic field 38.1 at a particular location in the first magnetic circuit 42.1 propagate within the associated first magnetic circuit 42.1 at the speed of light and are seen throughout the first magnetic circuit 42.1. Accordingly, the first magnetic field 38.1 sensed by the at least one first magnetic sensor 18 contains information about the nature of the remainder of the magnetic circuit, including the front door 24 and adjacent A-pillar 44 and B-pillar 32, any of which could be involved in and affected by a side-impact crash.

In the embodiment illustrated in FIG. 1, the vehicle 12 further incorporates a second magnetic crash sensor 10.2 comprising at least one third coil 64 at a corresponding at least one third location 66 of the vehicle 12, and an associated at least one second magnetic sensor 68 at a corresponding at least one fourth location 70 of the vehicle 12. For example, in the embodiment illustrated in FIG. 1, a third coil 64 is located around an upper hinge 72.1 of a rear door 74 of the vehicle 12, and the at least one second magnetic sensor 68 comprises a fourth coil 76 around the striker 28.2 of the door latch assembly 30.2 of the rear door 74, wherein the striker 28.2 is operatively coupled to the C-pillar 78 of the vehicle 12 and the fourth coil 76 is proximate thereto. The at least one third coil 64 is operatively coupled to a second coil driver 34.2, which is in turn operatively coupled to a second oscillator 36.2, wherein an oscillatory signal from the second oscillator 36.2 is applied by the second coil driver 34.2 so as to cause an associated current in the at least one third coil 64, responsive to which the at least one third coil 64 generates a second magnetic field 38.2 comprising magnetic flux 40 in the associated second magnetic circuit 42.2 comprising the B-pillar 32, rear door 74, C-pillar 78, and the body 46, frame 48 or powertrain 50 of the vehicle 12. The second oscillator 36.2 generates a oscillating signal, for example, having either a sinusoidal, square wave, triangular or other waveform shape, or a single frequency or a plurality of frequencies that, for example, are either stepped, continuously swept or simultaneous. The frequency is adapted so that the resulting second magnetic field 38.2 is conducted through the second magnetic circuit 42.2 with sufficient strength so as to provide a useful signal level from the second magnetic sensor 68, which cooperates therewith. The second magnetic field 38.2 is responsive to the reluctance $\mathcal{R}$ of the associated second magnetic circuit 42.2, which is affected by a crash involving the elements thereof and/or the gaps 52 therein. The second magnetic field 38.2 is sensed by the at least one second magnetic sensor 68, and a signal therefrom is conditioned by an associated second signal conditioner 54.2, demodulated by a second demodulator 56.2, converted from analog to digital form by a second analog-to-digital converter 58.2 and input as a second magnetic sensor signal 80 to the processor 62, which processes the signal as described more fully hereinbelow. The second signal conditioner 54.2 may incorporate buffering, amplification, high-pass, low-pass, or band-pass filtering. The second demodulator 56.2, for example, may provide amplitude demodulation, constant sampling relative to the phase of the second oscillator 36.2, or constant sampling relative to the phase of the signal sensed by the second magnetic sensor 68. For example, any envelope detection or phase or frequency demodulation technique could be used to obtain the demodulated signal. Since various demodulation techniques could be used to extract the crash information from the signal from the second magnetic sensor 68, the particular demodulation method will, for example, depend upon the particular implementation and the cost of the components used to perform this function. In another embodiment, the analog-to-digital conversion function and the demodulation function are combined a single process. It should be understood that the second demodulator 56.2 may also provide for amplification, and that the second analog-to-digital converter 58.2 would incorporate an associated sampler. Changes to the second magnetic field 38.2 at a particular location in the second magnetic circuit 42.2 propagate within the associated second magnetic circuit 42.2 at the speed of light and are seen throughout the second magnetic circuit 42.2. Accordingly, the second magnetic field 38.2 sensed by the at least one second magnetic sensor 68 contains information about the nature of the remainder of the magnetic circuit, including the rear door 74 and adjacent B-pillar 32 and C-pillar 78, any of which could be involved in and affected by a side-impact crash.

Alternatively, as suggested by FIG. 1, the first coil 14 could be located around the lower hinge 22.2 of the front door 24; the at least one first coil 14, could comprise first coils 14.1, 14.2 around the upper 22.1 and lower 22.2 hinges respectively; the third coil 64 could be located around the lower hinge 22.2 of the rear door 74; or the at least one third coil 64, could comprise third coils 64.1, 64.2 around the upper 72.1 and lower 72.2 hinges respectively. Furthermore, the first 36.1 and second 36.2 oscillators could be one and the same, or could be separate, operating at the same or different frequencies with the same type or different types of waveforms. Other arrangements of the magnetic sensor 10 can be used to provide the first 60 or second 80 magnetic sensor signals—for example, as described in U.S. Pat. Nos. 6,407,660, 6,433,688, 6,587,048, 6,777,927, which are incorporated herein by reference.

For example, in another embodiment, the magnetic sensor 18, 68 could comprise a coil located either on the door 24, 74, inside the door 24, 74, or on the frame 48 near a gap 52 between the door 24, 74 and the frame 48. Changes in the position of metal surrounding a single coil can be sensed by monitoring a measure of—or one or more measures responsive to—the self-inductance of the coil, for example, when excited with a time varying voltage, e.g. of constant amplitude. Stated in another way, a single coil can act to both generate and sense and associated magnetic field because current flowing through the coil is responsive to changes in the inductance thereof, whereby the inductance is responsive to both the properties of the coil itself, and to the shape and position of conductive and/or ferromagnetic materials (e.g. metals like steel or aluminum) proximate to the coil that affect the magnetic field associated therewith.

As another example, in yet another embodiment, the first 36.1 and/or second 32.2 oscillators may be replaced with pulse sources, whereby the pulse amplitude may be adapted to provide for sufficient signal-to-noise ratio and the pulse width may be adapted to provide for reduced power consumption.

As yet another example, in yet another embodiment, the first 10.1 and/or second 10.2 magnetic crash sensors need not necessarily incorporate associated first 36.1 or second 36.2 oscillators, or first 56.1 or second 56.2 demodulators, but instead the associated first 60 and second 80 magnetic sensor signals could be responsive to magnetostriction signals, magnetic coil pair signals, ferromagnetic shock signals, or other time varying magnetic signals that do not have a carrier from which the information must be extracted prior to analysis.

Figure 2:
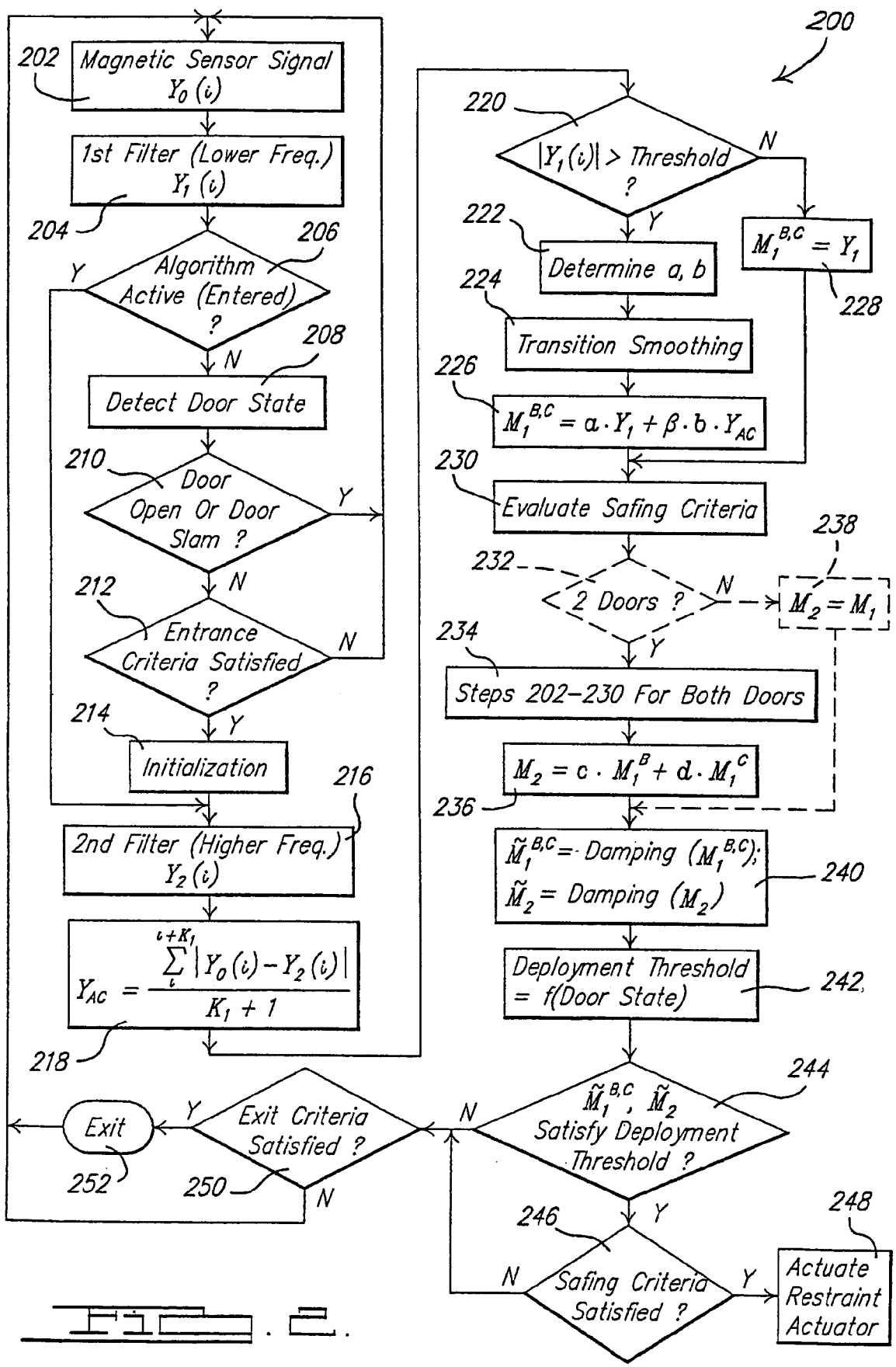
FIG. 2 illustrates a flow chart of a magnetic crash sensing algorithm.

The first magnetic sensor signal 60 from the first magnetic crash sensor 10.1—for a vehicle 12 with one magnetic crash sensor 10 on a particular side of the vehicle 12, —or the first 60 and second 80 magnetic sensor signals from the first 10.1 and second 10.2 magnetic crash sensors—for a vehicle 12 with two magnetic crash sensors 10 on a particular side of the vehicle 12, —are processed, for example, in accordance with a magnetic crash sensing algorithm 200 as illustrated by the flow chart of FIG. 2, which is executed separately for each side of vehicle 12.

Referring to FIG. 2, beginning with step (202), the processor 62 samples the $i^{th}$ sample of the first 60 or second 80 magnetic sensor signal responsive to the associated magnetic flux 40 at the location of the associated first 18 or second 68 magnetic sensor. For example, a sampling rate of about 6 KHz in one embodiment provides for medium-to-high frequency content in the raw sampled signal. For purposes of illustration, this signal is designated as $Y_0(i)$, which corresponds to the sampling of either the first 60 or second 80 magnetic sensor signal, depending upon which is being processed.

Then, in step (204) the sampled signal $Y_0(i)$ is filtered with a first filter to remove noise from the raw magnetic signal, using a relatively lower frequency filter, for example, a running average filter with a sufficiently wide associated time window. The filter is adapted to balance between providing for noise reduction, maintaining a relatively fast step response, and providing for relatively fast computation. For example, in one embodiment, the first filter incorporates a window of about 6 milliseconds, which corresponds to a low-pass cutoff frequency of about 100 Hz. A second embodiment of this filter could be a band-pass filter set produce a signal with relatively lower frequency content, for example from 50 Hz to 250 Hz. The output of the first filter is a first filtered signal $Y_1(i)$.

Then, in step (206), if the core crash detection algorithm (214–250) has been previously entered following step (212) and not subsequently exited at step (252), the process continues with step (216). Otherwise, in step (208), the opening state of the door is detected from the first filtered signal $Y_1(i)$, or another similar relatively longer time constant/lower frequency signal derived from the sampled signal $Y_0(i)$ (e.g. about a 1 Hz low-passed signal). The relatively slow motion of the doors 24, 74 (or of one of the doors 24 in a two-door vehicle 12) can be tracked from the magnitude of the associated first filtered signals $Y_1(i)$. As a door 24, 74 is opened, the magnetic flux 40 interacting with the magnetic sensor 18, 78 associated therewith changes, usually diminishing, in a predictable manner. For a two-door vehicle 12, the amount that the door 24 is open (i.e. degrees of rotation open) may be determined by comparison with calibration data comprising predetermined signal magnitudes known as a function of door angle. For a four-door vehicle 12, the amount that door 24, 74 is open on a given side of the vehicle 12 can be estimated by comparing the first 60 and second 80 magnetic sensor signals from a particular side of the vehicle 12 with the associated calibration data to determine the associated door state of the associated door 24, 74, so to provide for classifying the door state as either fully closed, partially latched, or open. It should be noted that if the first 10.1 or second 10.2 magnetic crash sensor comprises a coil 14, 64 located inside the door 24, 74 of the vehicle 12, wherein the associated first 60 or second 80 magnetic sensor signal was responsive to the self-inductance of the coil 14, 64, and if this coil 14, 64 was not substantially responsive to the position of the associated door 24, 74 relative to the frame 48 of the vehicle 12, then steps (208) and (210) of the magnetic crash sensing algorithm 200 would be omitted when processing that first 60 or second 80 magnetic sensor signal.

Generally, for each combination of these possible door states, the interpretation of the first 60 and second 80 magnetic sensor signals can be adjusted to avoid inadvertent deployments, alter deployment thresholds, or temporarily disable the safety restraint actuator 82, in accordance with the vehicle manufacturer's specifications. Recognition of the door state of the door 24, 74 provides for preventing inadvertent actuation of safety restraint actuator(s) 82 responsive to hard door slams or other "abuse events" when the doors 24, 74 are not fully latched. Levels of magnetic flux 40 that cannot be attributed to one of the possible door states can be indicative of a system failure or a change in the properties or geometry of the door 24, 74 beyond acceptable levels. Responsive to measuring an abnormal level of magnetic flux 40, the processor 62 can use an indicator 84, or an alarm, to alert an occupant of the vehicle of a potential system failure. Such recognition is possible within a relatively short period of time—e.g. within seconds—after occurrence and the monitoring for such a failure can occur continuously while the system is active.

Figure 3:
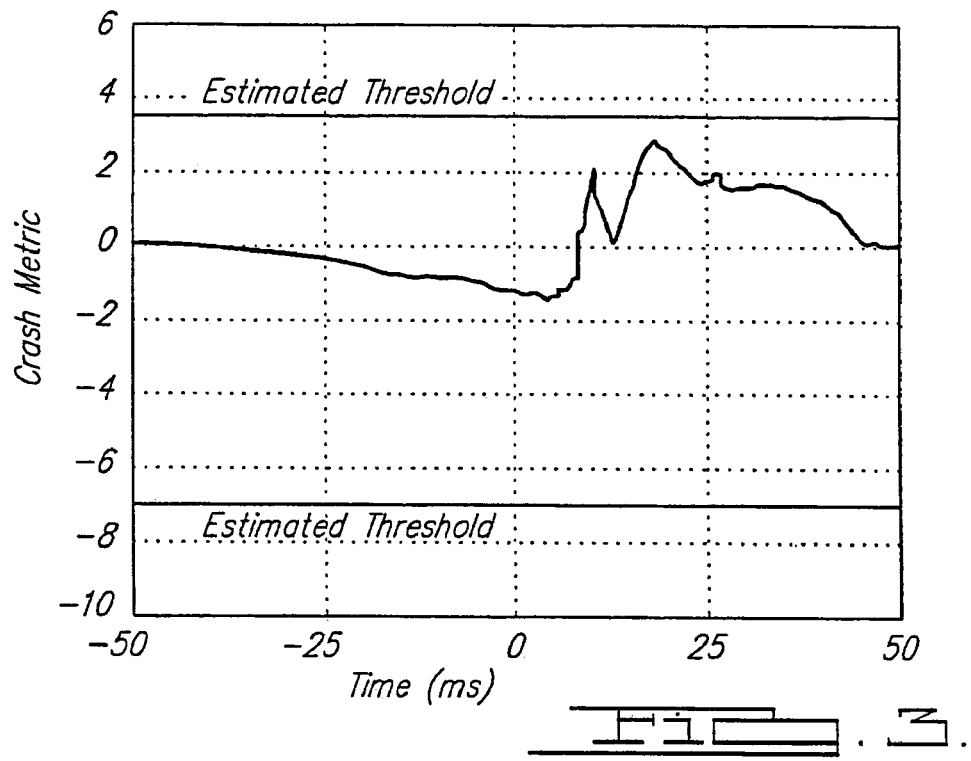
FIG. 3 illustrates a plot of a signal from a magnetic sensor of a magnetic crash sensor associated with a front door of a vehicle responsive to a relatively high speed slam of the front door.

Generally, if a door 24, 74 were open, the associated safety restraint actuator 82 cannot operate properly to protect an associated occupant, and therefore typically should be disabled until the door 24, 74 is closed. Furthermore, a door 24, 74 that is slammed can cause an associated large signal that could otherwise be incorrectly interpreted as a crash (unless an associated coil 14, 64 operated in a self-inductance mode were located inside the door 24, 74). For example, FIG. 3 illustrates a first magnetic sensor signal 60 generated responsive to a front door 24 being slammed shut by a hydraulic robot in accordance with a less than worse case magnitude condition, wherein the magnitude of the resulting first magnetic sensor signal 60 approaches an associated crash detection threshold. Accordingly, in one embodiment, if either door 24, 74 is detected as being either open or slammed on particular side of the vehicle 12, then the crash detection algorithm would prevent a safety restraint actuator 82, e.g. side air bag inflator, associated with that side of the vehicle 12 from actuating, so as to prevent an inadvertent deployment thereof. The responsiveness of the first 60 and second 80 magnetic sensor signals to the position of the door 24, 74 can be used to provide an indication to the driver if the door 24, 74 were open or not fully closed and could also control the activation of interior vehicle lighting, replacing the conventional door ajar switch. Such a door ajar detection function could also occur when the vehicle 12 was not turned on if the magnetic field were applied at a low duty cycle to conserve power.

If the door 24, 74 were partially latched, then the magnitude of the corresponding first 60 or second 80 magnetic sensor signal responsive to a crash can be substantially greater than that for a fully closed door 24, 74, however, if detected, this condition can be compensated by adjusting associated discrimination thresholds so as to avoid an inadvertent deployment of the safety restraint actuator 82 responsive to a significant, non-crash event (also known as an "abuse event"), as described more fully hereinbelow. The magnitude of the impact response of a coil 14, 64 operated in a self-inductance mode and located inside the door 24, 74 is not substantially affected by latch state of the door 24, 74 (i.e fully latched or partially latched).

Figure 4:
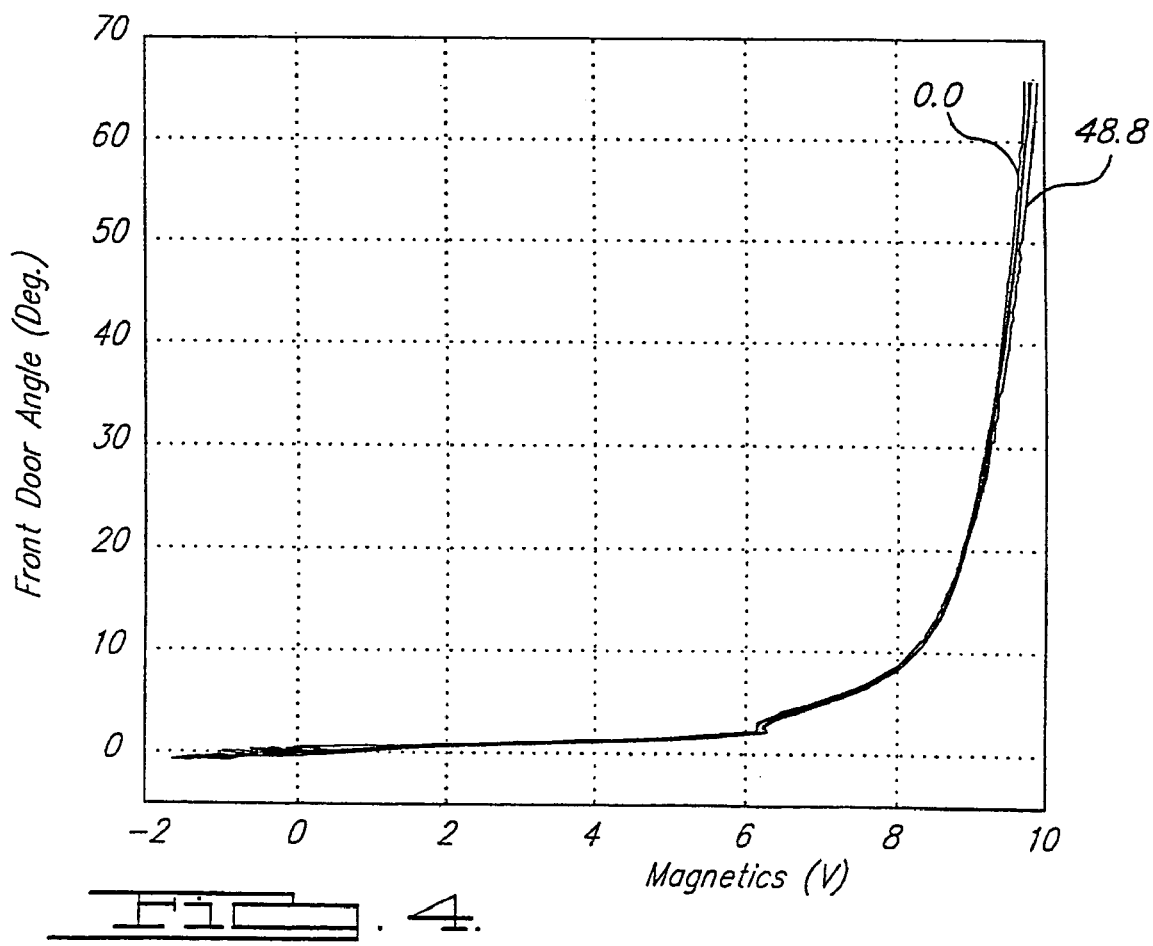
FIG. 4 illustrates a plot of a signal from a magnetic sensor of a magnetic crash sensor associated with a front door of a vehicle responsive to a relatively high speed slam of the front door, for various opening angles of the associated rear door.
Figure 3:
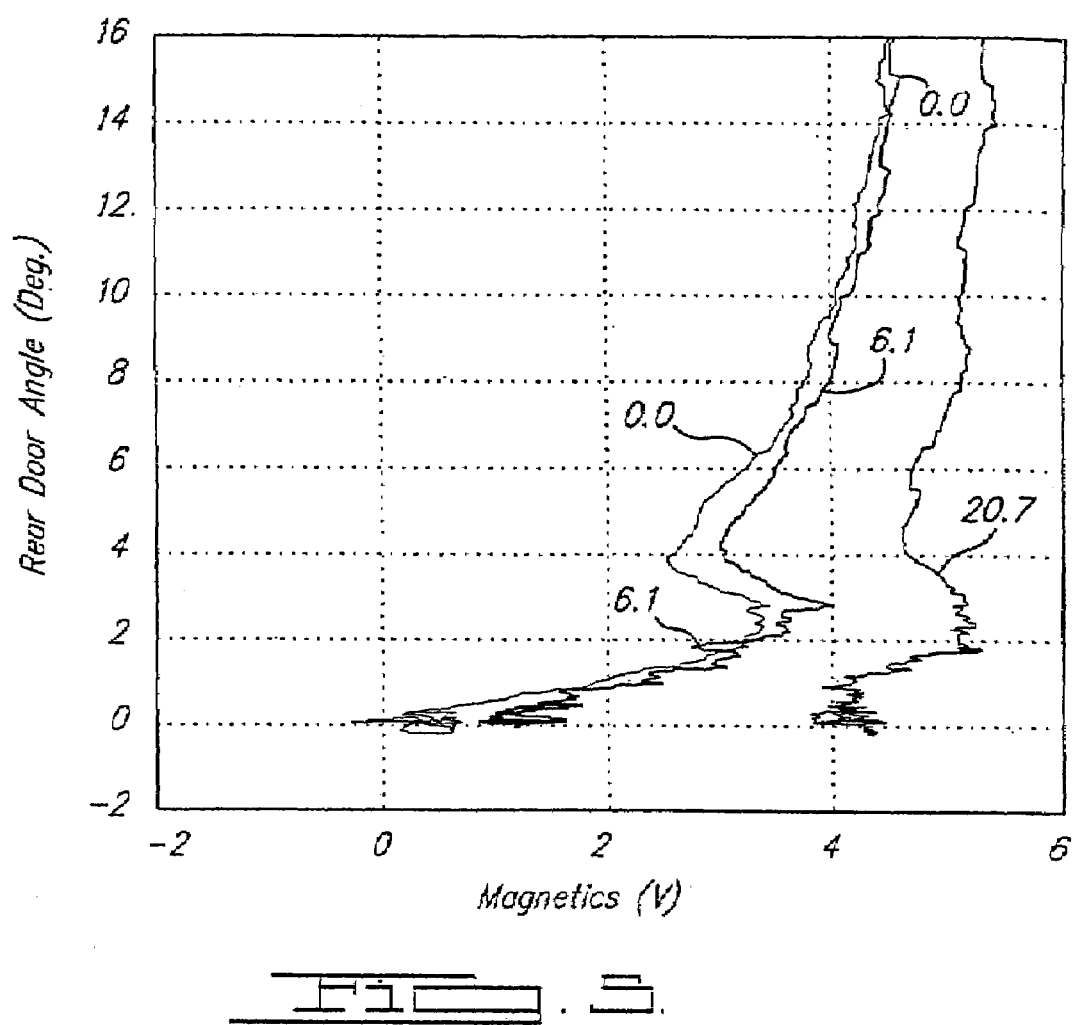

Referring to FIG. 4, the first magnetic sensor signal 60 from the first magnetic sensor 18 proximate to the B-pillar 32 is responsive to the angle of the front door 24 and is nearly independent of the angle of the rear door 74. Accordingly, it is possible to estimate the angle of the front door 24 from the magnitude of the first magnetic sensor signal 60, particularly the associated first filtered signal $Y_1(i)$, using calibration data, for example, as illustrated in FIG. 4. The sensitivity of the first magnetic sensor signal 60 is greater for smaller door angles than larger door angles, and for angles less than about 15 degrees, the door angle can be estimated relatively accurately. It is preferable that relatively short term signal offsets caused by effects other than door angle, such as temperature or recent mechanical changes to the front door 24, be maintained to less than an equivalent of about ±1 degree, in order to estimate the associated door state of the front door 24 sufficiently accurately Longer term signal offsets caused by effects such as door droop or accumulated damage can be characterized by monitoring the offset over time, and compensated by subtracting the offset from the signal. Another way to adjust for changes in door alignment over time is to compare the voltage applied to the at least one first coil 14 with the corresponding resulting current passing therethrough. Faraday's Law can be used to derive a relationship between the inductance L of the at least one first coil 14, which is influenced by the proximity to nearby metal (i.e. the local gap between the door 24 and the first location 16 of the at least one first coil 14), and the voltage (V) across and current (I) through the at least one first coil 14 (i.e. $V=L*dI/dt$). The measure of coil inductance derived from the known current (I) and voltage (V) in the at least one first coil 14 can provide for adapting the expected response of the first magnetic crash sensor 10.1 as a function of door angle.

Referring to FIG. 5, the second magnetic sensor signal 80 from the second magnetic sensor 68 proximate to the C-pillar 78 is a strong function of the angle of the rear door 74 and is also a function of the angle of the front door 24. Accordingly, because the second magnetic sensor signal 80 has significant response to the angle of the front door 24, the angle and associated door state of the front door 24 is determined first, and then used in the determination of the angle of the rear door 74. If the door state of the front door 24 is open, e.g. having an angle greater than about three degrees, then the door state of the rear door 74 need not be determined because, in that case, the safety restraint actuator 82 on that side of the vehicle 12 would be disabled anyway. If the door state of the front door 24 is either fully closed or partially latched, then the angle of the rear door 74 can be determined from the offset of the second magnetic sensor signal 80 using calibration data, for example as illustrated in FIG. 5. As with the front door 24, it is preferable that relatively short term signal offsets in the second magnetic sensor signal 80 caused by effects other than door angle, such as temperature or recent mechanical changes to the rear door 74, be maintained to less than an equivalent of about ±1 degree, in order to estimate the associated door state of the rear door 74 sufficiently accurately. Longer term signal offsets caused by effects such as door droop or accumulated damage can be characterized by monitoring the offset over time, and compensating by subtracting the offset from the signal.

Returning to FIG. 2, following the estimation in step (208) of the door state of the front 24 and rear 74 doors, in step (210), if a front 24 or rear 74 door is detected as being either open or slammed, the core crash detection algorithm (214–250) is not entered, but instead, the process repeats with step (202). For example, in one embodiment, a potential adverse affect of a door slam condition can be avoided by delaying the confirmation of a partially latched or closed door state for a brief period of time following the initial detection thereof.

Otherwise, if the front 24 and rear 74 doors are either partially latched or fully closed, then in step (212), if criteria for commencing the core crash detection algorithm (214–250), i.e. entrance criteria, are satisfied, then the core crash detection algorithm (214–250) is entered commencing with step (214). For example, the first filtered signal $Y_1(i)$ is compared with one or more previous values thereof for each door 24, 74, and if there is a sudden change in the first filtered signal $Y_1(i)$ for either door 24, 74 exceeding a minimum rate threshold, and if the magnitude of the first filtered signal $Y_1(i)$ exceeds a threshold, then the entrance criteria is satisfied. The algorithm entrance requirement of a significant and rapid shift in the magnitude of the magnetic flux 40 reaching the magnetic sensor 18, 68 provides a relatively simple way to reject various forms of AC electrical or mechanical noise. As another example, in one embodiment, if the absolute magnitude of the first filtered signal $Y_1(i)$ for the rear door 74 exceeds a threshold of about 0.6 volts, then the entrance criteria is satisfied. Although the magnetic crash sensing algorithm 200 of FIG. 2 illustrates a single step (212) at which the entrance criteria is tested, it is anticipated that there may be a plurality of different entrance criteria for associated different portions of the overall magnetic crash sensing algorithm 200, whereby there would be more than one associated step at which it would be determined if the associated entrance criteria satisfied the corresponding criteria necessary to commence that particular portion of the magnetic crash sensing algorithm 200. Upon entrance, the core crash detection algorithm (214–250) and associated steps (202) and (204) continue to be executed in sequence until either the safety restraint actuator 82 is actuated in step (248), or until the core crash detection algorithm (214–250) exits with step (252) because of either damped-out values of the associated discrimination metrics or because of a time-out condition.

Upon entrance of the core crash detection algorithm (214–250), in step (214), associated variables of the magnetic crash sensing algorithm 200 are initialized. Then in step (216), the sampled signal $Y_0(i)$ is filtered, for example, with a second low-pass filter with a relatively higher cut-off frequency, so as to extract relatively higher frequency information from the raw magnetic signal, for example, by using a running average filter with a relatively narrower associated time window. For example, in one embodiment, the first filter incorporates a window of about 1.1 millisecond which provides information in the range from DC to 250 Hz. The output of the second filter is a second filtered signal $Y_2(i)$.

Then, in step (218), an AC measure $Y_{AC}$ is calculated so as to provide a measure of mid-to-high frequency information from the magnetic signal on the impact side of the vehicle 12, for example, by calculating a running average of the difference between the sampled signal $Y_0(i)$ and the second filtered signal $Y_2(i)$, as follows:

$$Y_{AC} = \frac{\sum_{i}^{i+K_1} |Y_0(i) - Y_2(i)|}{K_1 + 1} \qquad (1)$$

For example, in one embodiment, $K_1$ is set so that the width of the running average window is about 5 milliseconds. Measurements have shown that an integration of the AC content of the magnetic signal is, in general, related to, e.g. proportional to, the impact energy or crash severity. The AC measure $Y_{AC}$ is a running average of the difference between the raw data and the mid-frequency low-pass filtered data that provides a measure of the fluctuation (AC) content of the magnetic signal, which is related to the door gap velocity, vibration, and crushing energy being transferred to the door 24, 74 by the crash. In another embodiment, a third filtered signal $Y_3(i)$ is generated by band-pass or high-pass filtering the sampled signal $Y_0(i)$, and the AC measure $Y_{AC}$ is calculated from a running average, or low-pass filtering, of the third filtered signal $Y_3(i)$. In yet another embodiment, the AC measure $Y_{AC}$ is generated from a running average, or low-pass filtering, of a measure $Y_4(i)$ of the time derivative of the third filtered signal $Y_3(i)$, for example, $Y_4(i)=Y_3(i)-Y_3(i-1)$. Accordingly, the AC measure $Y_{AC}$, provides a measure over some recent period of time (about 5 milliseconds) of the mid-to-high frequency content of the original sampled signal $Y_0(i)$, wherein the frequency spectra of the second filtered signal $Y_2(i)$ and the AC measure $Y_{AC}$ exhibits stronger higher frequency content than that of the corresponding first filtered signal $Y_1(i)$.

Stated in another way, for at least one first frequency less than at least one second frequency, the magnitude of a component of the relatively lower frequency first filtered signal $Y_1(i)$ at the at least one first frequency is greater than the corresponding magnitude of a component of the relatively higher frequency second filtered signal $Y_2(i)$ or the AC measure $Y_{AC}$ at the same at least one first frequency; and the magnitude of a component of the relatively lower frequency first filtered signal $Y_1(i)$ at the at least one second frequency is less than the corresponding magnitude of a component of the relatively higher frequency second filtered signal $Y_2(i)$ or the AC measure $Y_{AC}$ at the same at least one second frequency. Depending upon the particular application, the frequency ranges of the filters associated with the relatively lower frequency first filtered signal $Y_1(i)$, and the relatively higher frequency second filtered signal $Y_2(i)$ or the AC measure $Y^{AC}$, may be separated from one another, or may partially overlap, depending upon the nature of the particular vehicle, as necessary to provide for adequate discrimination of various crash and non-crash events from one another, and as necessary to provide for adequate detection speed. For example, data can be collected for a variety of impacts, e.g. pole, soft-bumper, ECE cart, FMVSS 214 barrier, and non-crash events, of various severities, and the associated filter types and cut-off frequencies may be adjusted, along with other parameters of the magnetic crash sensing algorithm 200, so as to provide for generating a timely safety restraint actuation signal when necessary, and so as to not generation a safety restraint actuation signal when not necessary.

Then, from step (220), if the magnitude of the first filtered signal $Y_1(i)$ exceeds a threshold, in steps (222)–(226) the relatively higher frequency AC measure $Y_{AC}$ is combined, e.g. linearly, with the relatively lower frequency first filtered signal $Y_1(i)$ to form first crash metric $M_1^B$ or $M_1^C$, corresponding to the front 24 or rear 74 door respectively. Otherwise, in step (228), the first crash metric $M_1^B$ or $M_1^C$ is set to the value of the corresponding first filtered signal $Y_1(i)$. The requirement of step (220) lessens the possibility of high frequency noise (which is not expected to have significant DC content) falsely enhancing the first crash metric $M_1^B$ or $M_1^C$ during non-crash conditions.

More particularly, in step (222), the values of coefficients a and b are determined. These coefficients are used in step (226) to calculate the first crash metric $M_1^B$ or $M_1^C$ as follows:

$$M_1^{B,C} = a \cdot Y_1 + \beta \cdot b \cdot Y_{AC} \quad (2)$$

where $\beta$ is a transition-smoothing factor determined in step (224) in accordance with a transition-smoothing algorithm. The coefficients a and b associated with the linear combination are specific to the particular type of vehicle 12, and would be determined from associated crash and non-crash data associated with "abuse events". The coefficients a and b determine the relative weighting or contribution of the relatively lower frequency first filtered signal $Y_1(i)$ and the relatively higher frequency AC measure $Y_{AC}$ in the first crash metric $M_1^B$ or $M_1^C$. For example, for a particular vehicle application, if the higher frequency components of the sampled signal $Y_0(i)$ provide a more reliable and repeatable indication of crash severity, the value of b might be set greater than that of a so as to relatively emphasize the higher frequency information in the first crash metric $M_1^B$ or $M_1^C$. In one embodiment, the coefficients a and b may be constants. In other embodiments, the sign and or magnitude of coefficients a and b may be a dynamic function of time of the sign or value of the second filtered signal $Y_2(i)$.

For example, in one embodiment of steps (220)–(228), if the magnitude of the first filtered signal $Y_1(i)$ associated with the rear door 74 is less than or equal to a threshold, then in step (226), the first crash metric $M_1^B$ or $M_1^C$ is set equal to the corresponding first filtered signal $Y_1(i)$. Otherwise, in step (222), a=1 and b=1 for the front door 24, and a=1 and b=−1 for the rear door 74, wherein the threshold level is the same as for the entrance criteria of step (212). Stated in another way, If $|Y_1^C| \leq DC\_Threshold$ (3.0)

Then $M_1^B = Y_1^B$ and $M_1^C = Y_1^C$ (3.1)

Otherwise (4.0)

$M_1^B = Y_1^B + Y_{AC}^B$ and $M_1^C = Y_1^C - Y_{AC}^C$ (4.1)

In accordance with another embodiment, additional conditions are provided as follows:

If $Y_1^C < Threshold^C$ OR $Y_1^B < Threshold^B$ (5.0)

Then Equations (3.0–3.1) and (4.0–4.1) (5.1)

Otherwise If $Y_1^C > Threshold^C$ Then (6.0)

If $Y_1^C \leq DC\_Threshold$ Then Equation(4.1) (6.1)

Otherwise If $Y_1^C \leq -DC\_Threshold$

Then $M_1^B = Y_1^B - Y_{AC}^B$ and $M_1^C = Y_1^C + Y_{AC}^C$ (6.2)

Otherwise Equation (3.1) (6.3)

wherein, in one embodiment, $Threshold^B$ is about −2.3 volts and $Threshold^C$ is between −1 and +1 volt.

In step (224), the transition-smoothing algorithm provides for smoothing the effect of a transition between an inclusion of the AC measure $Y_{AC}$ in the first crash metric $M_1^B$ or $M_1^C$, in step (226), and the exclusion thereof in the first crash metric $M_1^B$ or $M_1^C$, in step (228). More particularly, the transition smoothing algorithm provides for determining a value for the transition smoothing factor $\beta$ in equation (2) a) has a value that is bounded between 0.0 and 1.0; b) is initialized to 0.0; c) is incremented by a factor, for example, between 0.04 and 1.0 (i.e. no smoothing), e.g. 0.09 (i.e. 9%), for each iteration for which the result of step (220) is affirmative; and d) is decremented by that factor each iteration for which the result of step (220) is negative.

Then, in step (230), a safing criteria is evaluated so as to provide an independent basis for determining whether or not to enable actuation of the associated safety restraint actuator 82. Although the particular safing strategy would depend upon the requirements of the vehicle manufacturer, in accordance with one embodiment, the safing strategy is adapted so as to prevent a single point failure from causing an inadvertent actuation of the associated safety restraint actuator 82. The evaluation of the safing criteria may be performed by an independent processor so as to preclude the prospect of a failure of the processor 62 causing an inadvertent deployment. In accordance with one embodiment, the safing strategy is adapted so the first 60 and second 80 magnetic sensor signals are used to safe one another.

Furthermore, signals—e.g. associated current and voltage—from the first 34.1 and second 34.2 coil drivers are also monitored to verify the operation of the associated first 14 and third 64 coils, e.g. to verify the fidelity and operativeness of the coils and associated signals and to monitor the associated noise level. For example, referring to FIG. 1, one or more signals—e.g. a measure of current through the at least one first coil 14 and/or the associated voltage thereacross—from the first coil driver 34.1 are operatively coupled to at least one associated third demodulator 86.1, the output(s) of which is/are operatively coupled to an associated at least one third analog-to-digital converter 88.1, the output(s) of which is/are operatively coupled to the processor 62, so as to provide the signals necessary to verify the operation of the at least one first coil 14. Similarly one or more signals—e.g. a measure of current through the at least one third coil 64 and/or the associated voltage thereacross—from the second coil driver 34.2 are operatively coupled to at least one associated fourth demodulator 86.2, the output(s) of which is/are operatively coupled to an associated at least one fourth analog-to-digital converter 88.2, the output(s) of which is/are operatively coupled to the processor 62, so as to provide the signals necessary to verify the operation of the at least one third coil 64.

In accordance with one embodiment, the safing criteria are satisfied for a particular magnetic crash sensor 10.1, 10.2 if the associated coil driver 34.1, 34.2 generates a substantially noise-free signal at the proper amplitude and frequency, and both the first 60 and second 80 magnetic sensor signals exhibit substantial nominal signal levels and variation over time.

In accordance with another embodiment, the current though the first 14 or third 64 coil is processed to calculate two measures, TXRA and TXRA_ABS, respectively as running averages of the magnitude of this current and the absolute value of the magnitude of this current, wherein the running averages are calculated over a period of, for example, 1 to 7 milliseconds, e.g. 5 milliseconds. If ThresholdRA1<TXRA<ThresholdRA2 and TXRA_ABS<ThresholdRA3, then the current signal from the corresponding first 14 or third 64 coil is considered to be valid, and the corresponding first 14 or third 64 coil is considered to be operative. Also, substantially simultaneously, if $|Y_1|>\text{Threshold\_Y}_1^{B,C}$ and $|Y^{AC}|>\text{Threshold\_Y}_{AC}^{B,C}$ for both the first 60 and second 80 magnetic sensor signals, then the safing criteria is considered to be satisfied, and this condition is latched for a period of time, for example, a predetermined period of 30 milliseconds. If the conditions on TXRA or TXRA_ABS later both become unsatisfied, then the safing condition is unlatched substantially immediately thereafter. Otherwise, if any of the other four conditions become unsatisfied, then the safing condition is unlatched after the period of time lapses, unless within that interval, all six safing conditions again become satisfied.

Then, in step (232), if the vehicle 12 has two (or more) doors, e.g. a front 24 and rear 74 door on a particular side thereof, then in step (234), steps (202) through (230) are performed for each door 24, 74 using the associated first 60 and second 80 magnetic sensor signals from the corresponding first 18 and second 68 magnetic sensors, so as to determine the first crash metrics $M_1^B$ or $M_1^C$ for each door 24, 74.

Then, in step (236), if the vehicle 12 has two (or more) doors, a second crash metric $M_2$ is calculated from the combination, e.g. linear combination, of the first crash metrics $M_1^B$ and $M_1^C$ corresponding to different doors 24, 74 on the same side of the vehicle 12. For example, in one embodiment, the second crash metric $M_2$ is given by:

$$M_2 = c \cdot M_1^B + d \cdot M_1^C \qquad (7)$$

where c and d are coefficients that are specific to a particular type of vehicle 12. For example, in one embodiment, c=−1 and d=1. If the vehicle has only one door 24, then, from step (232), in step (238), the second crash metric $M_2$ is equal to the first crash metric $M_1^B$ (for purposes of describing a general magnetic crash sensing algorithm 200 in the context of a vehicle having an arbitrary number of doors on a side—in a two-door vehicle 12 having only one door 24 on a side, there would be no need to have distinct first $M_1^B$ and second $M_2$ crash metrics).

Then, from either step (236) or (238), in step (240), the values of the first $M_1^{B,C}$ and second $M_2$ crash metric are damped, so that the values of the respective resulting first $\tilde{M}_1^{B,C}$ and second $\tilde{M}_2$ damped crash metrics are attenuated over time to insignificant levels after the event subsides provided that a side impact crash of sufficient severity to warrant actuation of the safety restraint actuator 82 does not occur, even for events for which there may have been associated metal bending resulting from the crash. Damping provides for facilitating algorithm exit in step (250) following significant crash events that were not sufficiently severe to warrant actuation of the safety restraint actuator 82.

For example, in one embodiment, a damping factor $\alpha$ would be given by the summation of the absolute value of the first filtered signal $Y_1(i)$ commencing with algorithm entrance, and a corresponding crash metric M would be given by the product of that damping factor $\alpha$ times the first filtered signal $Y_1(i)$, as follows:

$$\alpha = \frac{C_2}{C_2 + C_1 \cdot \sum_i |Y_1(i)|} \qquad (8)$$

$$\tilde{M}(i) = \alpha \cdot Y_1(i) \qquad (9)$$

where $C_1$ and $C_2$ are constants.

As another example, in another embodiment, the damping factor $\alpha$ could include an integral of the AC measure $Y_{AC}$ commencing with algorithm entrance, or the sample number since algorithm entrance multiplied by a constant minus the running average of the AC measure $Y_{AC}$ calculated using a relatively long time window, e.g. greater than 10 milliseconds.

As yet another example, following algorithm entrance, the damping process commences if the absolute value of the first filtered signal $Y_1^C(i)$ from the second magnetic sensor signal 80 associated with the rear door 74 exceeds a threshold, e.g. 0.75, at which time a summation value $\sigma(0)$ is initialized to an initial value $\sigma_0$, for example, $\sigma_0 = 300$. Then, for each subsequent iteration, the second damped crash metric $\tilde{M}_2$ is calculated as follows:

$$\sigma(i) = \gamma \cdot |Y_1^B(i)| + \sigma(i-1) \qquad (10)$$

$$\tilde{M}_2(i) = M_2(i) \cdot \frac{\sigma_0}{\sigma(i)} \qquad (11)$$

where $\gamma$ is a damping modification factor, e.g. having a value of 0.7 for the particular embodiment, and $Y_1^B(i)$ is the value of the first filtered signal $Y_1(i)$ based on the first magnetic sensor signal 60.

Then, in step (242), the magnetic crash sensing algorithm 200 provides for adapting a deployment threshold as a function of the door state that was detected in step (208). For example, if one of the doors 24, 74 were partially latched rather than being fully closed, the magnitude of the second damped crash metric $\tilde{M}_2$ would likely be greater than if both doors were fully closed, and less than if both doors were partially latched. Accordingly, the deployment threshold can be adjusted to accommodate the combination of door states on a particular side of the vehicle 12, wherein, in one embodiment, the threshold would be lowest for both doors 24, 74 fully closed, highest for both doors 24, 74 partially latched, and intermediate thereto if one of the doors is fully closed and the other is partially latched. For a first 60 or second 80 magnetic sensor signal associated with a coil 14, 64 operated in a self-inductance mode and located inside the door 24, 74, a preset threshold scheme would be used in lieu of step (242).

Then, in step (244), the first $\tilde{M}_1^{B,C}$ and second $\tilde{M}_2$ damped crash metrics and the AC measure $Y_{AC}$ are compared with associated threshold levels (positive and negative), and, in one embodiment, if each metric or measure exceeds it respective threshold for at least a specified minimum number of consecutive iterations, then, in step (246), if the safing criteria from step (230) are also simultaneously satisfied, then in step (248) the appropriate safety restraint actuator(s) 82 is/are deployed. In one embodiment, neither the satisfaction of the deployment threshold in step (244) nor the satisfaction of the safing criteria in step (246) latches TRUE, but instead, both criteria must be simultaneously TRUE in order for the safety restraint actuator(s) 82 to be actuated. In another embodiment, other logical combinations of the various crash metrics and other measures are used in the actuation decision. For example, in another embodiment, the actuation decision could be governed by one or more of the various crash metrics and measures, or the satisfaction of the safing criteria could latch TRUE, so that an actuation of the safety restraint actuator(s) 82 would occur when the deployment threshold is satisfied in step (244) provided that the safing criteria had been satisfied earlier, subsequent to algorithm entrance.

Otherwise, from either step (244) or step (246), in step (250), if an exit criteria is satisfied, then the core crash detection algorithm (214–250) is exited in step (252), and the magnetic crash sensing algorithm 200 continues with step (202), whereupon subsequent entry of step (206), the algorithm will be indicated as being inactive (i.e. not entered) until the entrance criteria is again satisfied responsive to conditions on the first filtered signal $Y_1(i)$, which continues to be calculated in step (204) following the acquisition of the first 18 or second 68 magnetic sensor in step (202). For example, in accordance with one embodiment, the exit criteria is satisfied if the first filtered signals $Y_1^B$ and $Y_1^C$, the associated AC measures $Y_{AC}^B$ and $Y_{AC}^C$, and the damped crash metric $M_3$ are less than associated threshold values for a specified number of iterations of the core crash detection algorithm (214–250), or if the time period since algorithm entrance in step (212) exceeds a time-out threshold.

The above-described magnetic crash sensing algorithm 200 can be embodied in various ways, and can be modified within the scope of the instant invention.

For example, the first filtered signal $Y_1(i)$ and the AC measure $Y_{AC}$ could be processed separately, as if each were a separate crash metric. These individual metrics could then be separately damped (step (240)) and used separately to compare against individual deployment thresholds (step (244)). These metrics could alternatively be combined with similar metrics derived from a second magnetic sensor to create two $M_2$ metrics (following the example in step (236)): a low frequency and a higher frequency $M_2$ metric. This alternative individual signal processing creates more individual metrics, making the algorithm slightly more complicated, but also providing additional flexibility in setting deployment conditions.

As another example, additional filtered signals might be obtained from the raw data using different window running averages to produce time domain equivalents of high-pass frequency filtering, or other types of filters can be utilized, for example single or multiple pole low-pass or band-pass filters, other digital filters, e.g. FIR or IIR, or Fourier transform filters Several such filtered signals might be combined with each other or with the raw data signal to give measures associated with desired frequency bands. Such additional frequency analysis and derived measures might be necessary for a specific vehicle platform or magnetic system mounting location and method and would be based upon the associated crash data and data from non-crash "abuse events".

The magnetic crash sensing algorithm 200 provides a method of processing magnetic crash signals from a magnetic crash sensor so as to provide for the rapid, real time determination of both the crash severity and the associated crash type (e.g. pole crash vs. barrier crash) for a particular crash event The magnetic crash sensing algorithm 200 provides for the actuation of safety restraint actuator(s) 82 at a relatively early time as necessary so as to provide for protecting the occupant from the crash, while also discriminating lower severity crash events (as determined by potential occupant injury) so as to avoid inadvertent or unnecessary actuation of safety restraint actuator(s) 82, particularly those safety restraint actuator(s) 82 which are not resetable, i.e. reusable for multiple crash events. The magnetic crash sensing algorithm 200 also provides for immunity to external electrical and mechanical "abuse events" including those caused by electromagnetic induction, or localized impacts with relatively low mass but high speed objects. The associated magnetic crash sensors 10.1, 10.2 provide for distributed crash sensing that can be beneficially less sensitive to localized mechanical or electrical disturbances which might otherwise adversely affect a crash sensing system using more localized crash sensors.

The polarity of the associated magnetic crash sensor signals 60, 80 provides information that can be used for distinguishing various types of crashes. For example, in one embodiment, measured data suggests that localized impacts that cause significant intrusion into the vehicle will give a positive crash metric polarity while more broad surface impacts will give a negative polarity crash metric. Pole-like impacts might be identified as positive polarity while cart-like impacts would be identified by negative polarity. The door motion and crush will vary between crash types, potentially producing signals of opposite sign that correspond to more or less magnetic signal (magnetic flux 40) reaching the receiver sensors than is normally received.

While specific embodiments have been described in detail, those with ordinary skill in the art will appreciate that various modifications and alternatives to those details could be developed in light of the overall teachings of the disclosure. For example, although the magnetic crash sensing algorithm 200 has been described herein in the context of side impact crash detection, a similar algorithm could be used to detect impacts anywhere on the vehicle using appropriate associated magnetic crash sensor hardware. Accordingly, the particular arrangements disclosed are meant to be illustrative only and not limiting as to the scope of the invention, which is to be given the full breadth of the appended claims and any and all equivalents thereof.

What is claimed is:

1. A method of sensing a condition of a magnetic circuit, comprising:
   a. generating at least one signal responsive to at least one magnetic field in at least one magnetic circuit, wherein said at least one magnetic field is generated within a vehicle, and said at least one magnetic circuit comprises at least a portion of said vehicle;
   b. filtering said at least one signal with at least one first filter so as to generate a corresponding at least one first filtered signal;
   c. filtering said at least one signal with at least one second filter so as to generate a corresponding at least one second filtered signal, wherein said at least one first filter and said at least one second filter are adapted so that a magnitude of a component of said at least one first filtered signal at at least one first frequency is greater than a magnitude of a component of said at least one second filtered signal at said at least one first frequency, and a magnitude of a component of said at least one second filtered signal at at least one second frequency is greater than a magnitude of a component of said at least one first filtered signal at said at least one second frequency, wherein said is at least one second frequency is greater than said at least one first frequency; and d. sensing a condition of said at least one magnetic circuit responsive to said at least one first filtered signal and responsive to said at least one second filtered signal.

2. A method of sensing a condition of a magnetic circuit, comprising:
   a. generating at least one signal responsive to at least one magnetic field in at least one megnetic circuit, wherein said at least one signal is generated by at least one magnetic sensor operatively associated with at least one first location of said at least one magnetic circuit, and at least a portion of said at least one magnetic field is generated by at least one first coil operatively associated with a second location of said at least one magnetic circuit;
   b. filtering said at least one signal with at least one first filter so as to generate a corresponding at least one first filtered signal;
   c. filtering said at least one signal with at least one second filter so as to generate a corresponding at least one second filtered signal, wherein said at least one first filter and said at least one second filter are adapted so that a magnitude of a component of said at least one first filtered signal at at least one first frequency is greater than a magnitude of a component of said at least one second filtered signal at said at least one first frequency, and a magnitude of a component of said at least one second filtered signal at at least one second frequency is greater than a magnitude of a component of said at least one first filtered signal at said at least one second frequency, wherein said at least one second frequency is greater than said at least one first frequency; and
   d. sensing a condition of said at least one magnetic circuit responsive to said at least one first filtered signal and responsive to said at least one second filtered signal.

3. A method of sensing a condition of a magnetic circuit, comprising:
   a. generating at least one signal responsive to at least one magnetic field in at least one magnetic circuit, wherein said at least one signal is responsive to a self-inductance of at least one first coil operatively associated with said at least one magnetic circuit;
   b. filtering said at least one signal with at least one first filter so as to generate a corresponding at least one first filtered signal;
   c. filtering said at least one signal with at least one second filter so as to generate a corresponding at least one second filtered signal, wherein said at least one first filter and said at least one second filter are adapted so that a magnitude of a component of said at least one first filtered signal at at least one first frequency is greater than a magnitude of a component of said at least one second filtered signal at said at least one first frequency, and a magnitude of a component of said at least one second filtered signal at at least one second frequency is greater than a magnitude of a component of said at least one first filtered signal at said at least one second frequency, wherein said at least one second frequency is greater than said at least one first frequency; and
   d. sensing a condition of said at least one magnetic circuit responsive to said at least one first filtered signal and responsive to said at least one second filtered signal.

4. A method of sensing a condition of a magnetic circuit, comprising:
   a. generating at least one signal responsive to at least one magnetic field in at least one magnetic circuit, wherein said at least one signal is responsive to at least one time-varying magnetic field, and at least a portion of said at least one time-varying magnetic field is generated in said at least one magnetic circuit by at least one first coil operatively associated with said at least one magnetic circuit responsive to at least one time-varying signal operatively associated with said at least one first coil;
   b. filtering said at least one signal with at least one first filter so as to generate a corresponding at least one first filtered signal;
   c. filtering said at least one signal with at least one second filter so as to generate a corresponding at least one second filtered signal, wherein said at least one first filter and said at least one second filter are adapted so that a magnitude of a component of said at least one first filtered signal at at least one first frequency is greater than a magnitude of a component of said at least one second filtered signal at said at least one first frequency, and a magnitude of a component of said at least one second filtered signal at at least one second frequency is greater than a magnitude of a component of said at least one first filtered signal at said at least one second frequency, wherein said at least one second frequency is greater than said at least one first frequency; and
   d. sensing a condition of said at least one magnetic circuit responsive to said at least one first filtered signal and responsive to said at least one second filtered signal.

5. A method of sensing a condition of a magnetic circuit as recited in claim 4, wherein the operation of generating said at least one signal comprises demodulating at least one signal responsive to said at least one magnetic field.

6. A method of sensing a condition of a magnetic circuit as recited in claim 1, wherein said at least one magnetic circuit comprises a body of a vehicle.

7. A method of sensing a condition of a magnetic circuit as recited in claim 6, wherein said at least one magnetic circuit comprises at least one door of said vehicle.

8. A method of sensing a condition of a magnetic circuit as recited in claim 1, wherein the operation of sensing a condition of said at least one magnetic circuit comprises a sensing algorithm with an entrance criteria and an exit criteria, upon or after satisfaction of said entrance criteria, said sensing algorithm is entered, and upon or after satisfaction of said exit criteria, said sensing algorithm is exited.

9. A method of sensing a condition of a magnetic circuit as recited in claim 8, wherein said satisfaction of said entrance criteria is responsive to said at least one first filtered signal.

10. A method of sensing a condition of a magnetic circuit as recited in claim 8, wherein upon or after said satisfaction of said entrance criteria, at least one data element associated with said sensing algorithm is initialized.

11. A method of sensing a condition of a magnetic circuit, comprising:

a. generating at least one signal responsive to at least one magnetic field in at least one magnetic circuit;
b. filtering said at least one signal with at least one first filter so as to generate a corresponding at least one first filtered signal;
c. filtering said at least one signal with at least one second filter so as to generate a corresponding at least one second filtered signal, wherein said at least one first filter and said at least one second filter are adapted so that a magnitude of a component of said at least one first filtered signal at at least one first frequency is greater than a magnitude of a component of said at least one second filtered signal at said at least one first frequency, and a magnitude of a component of said at least one second filtered signal at at least one second frequency is greater than a magnitude of a component of said at least one first filtered signal at said at least one second frequency, wherein said at least one second frequency is greater than said at least one first frequency, and the operation of filtering said at least one signal with at least one second filter commences after said entrance criteria is satisfied; and
d. sensing a condition of said at least one magnetic circuit responsive to said at least one first filtered signal and responsive to said at least one second filtered signal, wherein the operation of sensing a condition of said at least one magnetic circuit comprises a sensing algorithm with an entrance criteria and an exit criteria, upon or after satisfaction of said entrance criteria, said sensing algorithm is entered, and upon or after satisfaction of said exit criteria, said sensing algorithm is exited.

12. A method of sensing a condition of a magnetic circuit, comprising:
a. generating at least one signal responsive to at least one magnetic field in at least one magnetic circuit;
b. filtering said at least one signal with at least one first filter so as to generate a corresponding at least one first filtered signal;
c. filtering said at least one signal with at least one second filter so as to generate a corresponding at least one second filtered signal, wherein said at least one first filter and said at least one second filter are adapted so that a magnitude of a component of said at least one first filtered signal at at least one first frequency is greater than a magnitude of a component of said at least one second filtered signal at said at least one first frequency, and a magnitude of a component of said at least one second filtered signal at at least one second frequency is greater than a magnitude of a component of said at least one first filtered signal at said at least one second frequency, wherein said at least one second frequency is treater than said at least one first frequency;
d. sensing a condition of said at least one magnetic circuit responsive to said at least one first filtered signal and responsive to said at least one second filtered signal, wherein the operation of sensing a condition of said at least one magnetic circuit comprises a sensing algorithm with an entrance criteria and an exit criteria, upon or after satisfaction of said entrance criteria, said sensing algorithm is entered, and upon or after satisfaction of said exit criteria, said sensing algorithm is exited; and
e. detecting an opening state of at least one door of a vehicle from said at least one first filtered signal, and not entering said sensing algorithm if said opening state of said at least one door comprises either an open said at least one door or a recent forceful closure of said at least one door.

13. A method of sensing a condition of a magnetic circuit, comprising;
a. generating at least one signal responsive to at least one magnetic field in at least one magnetic circuit;
b. filtering said at least one signal with at least one first filter so as to generate a corresponding at least one first filtered signal;
c. filtering said at least one signal with at least one second filter so as to generate a corresponding at least one second filtered signal, wherein said at least one first filter and said at least one second filter are adapted so that a magnitude of a component of said at least one first filtered signal at at least one first frequency is greater than a magnitude of a component of said at least one second filtered signal at said at least one first frequency, and a magnitude of a component of said at least one second filtered signal at at least one second frequency is greater than a magnitude of a component of said at least one first filtered signal at said at least one second frequency, wherein said at least one second frequency is greater than said at least one first frequency;
d. sensing a condition of said at least one magnetic circuit responsive to said at least one first filtered signal and responsive to said at least one second filtered signal; and
e. generating at least one AC measure, wherein said at least one AC measure is responsive to said at least one signal prior to said filtering said at least one signal, said at least one AC measure is responsive to said at least one second filtered signal, and the operation of sensing said condition of said at least one magnetic circuit is responsive to said at least one AC measure.

14. A method of sensing a condition of a magnetic circuit, comprising:
a. generating at least one signal responsive to at least one magnetic field in at least one magnetic circuit;
b. filtering said at least one signal with at least one first filter so as to generate a corresponding at least one first filtered signal;
c. filtering said at least one signal with at least one second filter so as to generate a corresponding at least one second filtered signal, wherein said at least one first filter and said at least one second filter are adapted so that a magnitude of a component of said at least one first filtered signal at at least one first frequency is greater than a magnitude of a component of said at least one second filtered signal at said at least one first frequency, and a magnitude of a component of said at least one second filtered signal at at least one second frequency is greater than a magnitude of a component of said at least one first filtered signal at said at least one second frequency, wherein said at least one second frequency is greater than said at least one first frequency;
d. sensing a condition of said at least one magnetic circuit responsive to said at least one first filtered signal and responsive to said at least one second filtered signal; and
e. generating at least one AC measure responsive to said at least one signal and to said at least one second filtered signal, wherein the operation of sensing said condition of said at least one magnetic circuit is responsive to said at least one AC measure, and said at least one AC measure comprises a summation of an absolute value of a difference between said at least one signal and said at least one second filtered signal, and said summation extends over a recent period of time.

15. A method of sensing a condition of a magnetic circuit, comprising:
   a. generating at least one signal responsive to at least one magnetic field in at least one magnetic circuit;
   b. filtering said at least one signal with at least one first filter so as to generate a corresponding at least one first filtered signal;
   c. filtering said at least one signal with at least one second filter so as to generate a corresponding at least one second filtered signal, wherein said at least one first filter and said at least one second filter are adapted so that a magnitude of a component of said at least one first filtered signal at at least one first frequency is greater than a magnitude of a component of said at least one second filtered signal at said at least one first frequency, and a magnitude of a component of said at least one second filtered signal at at least one second frequency is greater than a magnitude of a component of said at least one first filtered signal at said at least one second frequency, wherein said at least one second frequency is greater than said at least one first frequency;
   d. sensing a condition of said at least one magnetic circuit responsive to said at least one first filtered signal and responsive to said at least one second filtered signal;
   e. generating at least one AC measure responsive to said at least one signal and to said at least one second filtered signal, wherein the operation of sensing said condition of said at least one magnetic circuit is responsive to said at least one AC measure; and
   f. generating at least one first metric as a corresponding at least one combination of said at least one first filtered signal and said at least one AC measure, wherein the operation of sensing said condition of said at least one magnetic circuit is responsive to said at least one first metric.

16. A method of sensing a condition of a magnetic circuit as recited in claim 15, wherein a relative weighting of said at least one first filtered signal and said at least one AC measure in said at least one combination is responsive to said at least one first filtered signal.

17. A method of sensing a condition of a magnetic circuit as recited in claim 16, wherein if said at least one first filtered signal does not exceed a threshold, then said at least one first metric is set equal to said at least one first filtered signal.

18. A method of sensing a condition of a magnetic circuit as recited in claim 15, wherein a relative weighting of said at least one first filtered signal and said at least one AC measure in said at least one combination is responsive to a transition-smoothing factor, wherein said transition-smoothing factor is incremented or decremented responsive to whether or not said at least one first filtered signal exceeds a threshold.

19. A method of sensing a condition of a magnetic circuit as recited in claim 18, wherein said transition-smoothing factor is bounded.

20. A method of sensing a condition of a magnetic circuit as recited in claim 15, further comprising damping said at least one first metric over time.

21. A method of sensing a condition of a magnetic circuit, comprising:
   a. generating at least one signal responsive to at least one magnetic field in at least one magnetic circuit;
   b. filtering said at least one signal with at least one first filter so as to generate a corresponding at least one first filtered signal;
   c. filtering said at least one signal with at least one second filter so as to generate a corresponding at least one second filtered signal, wherein said at least one first filter and said at least one second filter are adapted so that a magnitude of a component of said at least one first filtered signal at at least one first frequency is greater than a magnitude of a component of said at least one second filtered signal at said at least one first frequency, and a magnitude of a component of said at least one second filtered signal at at least one second frequency is greater than a magnitude of a component of said at least one first filtered signal at said at least one second frequency, wherein said at least one second frequency is treater than said at least one first frequency;
   d. sensing a condition of said at least one magnetic circuit responsive to said at least one first filtered signal and responsive to said at least one second filtered signal; and
   e. generating a second metric, wherein said second metric is a combination of a first said first metric and a second said first metric, wherein said first said first metric is responsive to a condition of a first door of a vehicle, and a second said first metric is responsive to a condition of a second door of said vehicle, wherein said first and second doors are on a same side of said vehicle.

22. A method of sensing a condition of a magnetic circuit as recited in claim 21, further comprising damping said second metric over time.

23. A method of sensing a condition of a magnetic circuit, comprising:
   a. generating at least one signal responsive to at least one magnetic field in at least one magnetic circuit, wherein said at least one magnetic circuit comprises at least a portion of a vehicle susceptible to a crash, further comprising determining whether or not to actuate a safety restraint actuator responsive to the operation of sensing a condition of said at least one magnetic circuit;
   b. filtering said at least one signal with at least one first filter so as to generate a corresponding at least one first filtered signal;
   c. filtering said at least one signal with at least one second filter so as to generate a corresponding at least one second filtered signal, wherein said at least one first filter and said at least one second filter are adapted so that a magnitude of a component of said at least one first filtered signal at at least one first frequency is greater than a magnitude of a component of said at least one second filtered signal at said at least one first frequency, and a magnitude or a component of said at least one second filtered signal at at least one second frequency is greater than a magnitude of a component of said at least one first filtered signal at said at least one second frequency, wherein said at least one second frequency is greater than said at least one first frequency; and
   d. sensing a condition of said at least one magnetic circuit responsive to said at least one first filtered signal and responsive to said at least one second filtered signal.

24. A method of sensing a condition of a magnetic circuit as recited in claim 23, further comprising detecting an opening state of at least one door of said vehicle from said at least one first filtered signal, and preventing actuation of said safety restraint actuator if said opening state of said at least one door comprises either an open said at least one door or a recent forceful closure of said at least one door.

25. A method of sensing a condition of a magnetic circuit as recited in claim 23, wherein the operation of determining whether or not to actuate said safety restraint actuator is responsive to a deployment threshold, and said deployment threshold is responsive to at least one door opening state of at least one door of said vehicle.

26. A method of sensing a condition of a magnetic circuit as recited in claim 23, further comprising determining if a safing criteria is satisfied, wherein the operation of determining whether or not to actuate a safety restraint actuator is responsive to the operation of determining if said safing criteria is satisfied.

27. A method of sensing a condition of a magnetic circuit as recited in claim 26, wherein said at least one signal comprises a plurality of signals, and the operation of determining if said safing criteria is satisfied is responsive to said plurality of signals responsive to said at least one magnetic field, wherein at least two of said plurality of signals are associated with different magnetic circuits.

28. A method of sensing a condition of a magnetic circuit as recited in claim 26, wherein the operation of determining if said safing criteria is satisfied is responsive to at least one signal used to generate at least a portion of said at least one magnetic field in said at least one magnetic circuit.

29. A method of providing for sensing a condition of a magnetic circuit, comprising:

a. providing for generating at least one signal responsive to at least one magnetic field in at least one magnetic circuit, wherein said at least one magnetic field is generated within a vehicle, and said at least one magnetic circuit comprises at least a portion of said vehicle;

b. providing for filtering said at least one signal with at least one first filter so as to generate a corresponding at least one first filtered signal;

c. providing for filtering said at least one signal with at least one second filter so as to generate a corresponding at least one second filtered signal, wherein said at least one first filter and said at least one second filter are adapted so that a magnitude of a component of said at least one first filtered signal at at least one first frequency is greater than a magnitude of a component of said at least one second filtered signal at said at least one first frequency, and a magnitude of a component of said at least one second filtered signal at at least one second frequency is greater than a magnitude of a component of said at least one first filtered signal at said at least one second frequency; and d. providing for sensing a condition of said at least one magnetic circuit responsive to said at least one first filtered signal and responsive to said at least one second filtered signal.

* * * * *